United States Patent
Bathen et al.

(10) Patent No.: US 10,476,879 B2
(45) Date of Patent: Nov. 12, 2019

(54) BLOCKCHAIN AUTHENTICATION VIA HARD/SOFT TOKEN VERIFICATION

(71) Applicant: International Business Machines Corporation, Armonk, NY (US)

(72) Inventors: Luis Angel D. Bathen, Placentia, CA (US); Gabor Madl, San Jose, CA (US); Ramani Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/660,756

(22) Filed: Jul. 26, 2017

(65) Prior Publication Data
US 2019/0036932 A1    Jan. 31, 2019

(51) Int. Cl.
*H04L 29/06*    (2006.01)
*H04L 9/30*    (2006.01)
*H04L 9/32*    (2006.01)

(52) U.S. Cl.
CPC .............. *H04L 63/102* (2013.01); *H04L 9/30* (2013.01); *H04L 9/3234* (2013.01); *H04L 9/3239* (2013.01); *H04L 63/0428* (2013.01); *H04L 63/083* (2013.01); *H04L 63/0838* (2013.01); *H04L 63/0853* (2013.01); *H04L 63/101* (2013.01); *H04L 63/20* (2013.01); *H04L 2209/38* (2013.01); *H04L 2463/082* (2013.01)

(58) Field of Classification Search
CPC ....... H04L 63/102; H04L 9/30; H04L 63/083; H04L 9/32; H04L 63/0428; H04L 63/0853; H04L 63/20; H04L 63/101; H04L 63/0838; H04L 2463/082; H04L 2209/38
See application file for complete search history.

(56) References Cited

U.S. PATENT DOCUMENTS

| | | | |
|---|---|---|---|
| 2015/0332283 A1* | 11/2015 | Witchey | G06Q 30/018 705/3 |
| 2016/0005032 A1 | 1/2016 | Yau et al. | |
| 2016/0261411 A1* | 9/2016 | Yau | H04L 63/0807 |
| 2016/0275461 A1 | 9/2016 | Sprague et al. | |
| 2016/0342978 A1* | 11/2016 | Davis | G06Q 20/02 |
| 2017/0046638 A1* | 2/2017 | Chan | G06Q 20/0655 |
| 2017/0140408 A1* | 5/2017 | Wuehler | G06Q 30/0207 |

(Continued)

FOREIGN PATENT DOCUMENTS

| | | |
|---|---|---|
| WO | 2016156954 A1 | 10/2016 |
| WO | 2017044554 A1 | 3/2017 |

OTHER PUBLICATIONS

Zhang et al., "Town Crier: An Authenticated Data Feed for Smart Contracts", Proceedings of the 2016 ACM SIGSAC Conference on Computer and Communications security, Vienna, Austria—Oct. 24-28, (Year: 2016).*

(Continued)

*Primary Examiner* — Morshed Mehedi

(57) ABSTRACT

An example operation may include one or more of storing a public key and one or more corresponding addresses associated with a user profile in a blockchain, creating a credential for the user profile based on the public key, forwarding the credential to the one or more addresses, receiving a request for access to a site from a user device associated with the user profile, and retrieving the credential based on the one or more addresses from the blockchain.

20 Claims, 7 Drawing Sheets

(56) References Cited

U.S. PATENT DOCUMENTS

2018/0137512 A1* 5/2018 Georgiadis ............ H04L 9/3239
2018/0158051 A1* 6/2018 Arora ................. G06Q 20/3829

OTHER PUBLICATIONS

Anonymously; Securing Credit/Debit Card Transactions Using 2 Factor Authentication Tokens, ip.com, Mar. 21, 2014.
Anonymously; System, Method and Apparatus for Human Integration into Multi-Factor Authentication, ip.com, Mar. 12, 2012.
Anonymously; A Two Factor Authentication Mechanism for Establishing Network Connections, ip.com, Nov. 23, 2011.
Mann, C. et al.; Two-Factor Authentication for the Bitcoin Protocol, Google, Nov. 2014.
Di Francesco Maesa Damiano et al; "BlockChain Based Access Control"; University of Pisa, Department of Computer Science, Pisa, Italy; date unknown; last downloaded on Nov. 11, 2018.
International Search Report and Written Opinion of the International Search Authority issued in PCT Application No. PCT/EP2018/070023; dated Oct. 25, 2018.

* cited by examiner

BLOCKCHAIN AUTHENTICATION VIA HARD/SOFT TOKEN VERIFICATION

TECHNICAL FIELD

This application generally relates to the management of authorization access, and more particularly, to blockchain authentication via hard/soft token verification.

BACKGROUND

A blockchain is a type of computing architecture that enables a peer-to-peer distributed (shared and replicated) database or ledger, not controlled by a single organization or entity, but many different ones. Spanning across a network of independent machines, the configuration permits the nodes to reliably track and maintain the state of information in a system. In doing so, a blockchain enables the cost-efficient creation of business networks without requiring a central point of control. This configuration operates in contrast to traditional database-oriented systems, where independent parties maintain their own systems of record and reconcile updates with one another in inefficient and sometimes complex inter-organizational processes, which requires the services of an independent, trusted third-party administrator.

Two-factor authentication is the de-facto type of authentication approved by most major government agencies, such as the Department of Defense (DoD). Two-factor authentication is performed via the use of common access cards (CACs), and/or hardware dongles, such as security identification key 'fobs'. CACs rely on a centralized server that is used to validate the ID/EDIPI number present in the card. Hardware tokens do not need to communicate with a back-end server as they have the necessary components needed to generate one time codes (e.g., one time passwords) to access a system. Such tokens need to be verified as the backend system will need to verify that the token provided by the user matches.

Two-factor authentication is a well-known type of security procedure applied to various computing systems and networks. Social media sites and e-mail providers use mobile devices as a second form of authentication (e.g., password+access code, which is sent to a mobile phone). The DoD has specified that all DoD networks must be CAC protected. In order to use CACs, systems need to support DoD PKIs, which are a set of roles, policies, and procedures needed to create, manage, distribute, use, store, and revoke digital certificates and manage public-key encryption. PKIs work under the assumptions that systems are within DoD networks. This becomes a challenge when trying to authenticate users without access to the DoD network (e.g., tactical environments). The DoD/DoJ are able to cross-authenticate users via CAC cards and their respective PKIs by using a bridge. Deploying such an infrastructure can be complicated. Hardware tokens are often more trusted than mobile devices given that most of them are tamper proof, however, managing those devices is another challenge.

In a conventional authentication mechanism, an authentication process may use either a CAC card or a hardware token. This approach would permit a user inside the private network to authenticate using a CAC card since that internal user is within the network. A user outside the private network may have a valid CAC, and may attempt to register with a third party site, affiliated with the private network, however, since the external user is not within the private network, the request will be rejected and the external user will be denied access to the private network.

SUMMARY

One example embodiment may include a method that provides one or more of storing a public key and a corresponding address associated with a user profile in a blockchain, creating a set of credentials for the user profile based on the public keys, forwarding the credentials to the one or more addresses, receiving a request for access to a site from a user device associated with the user profile, and retrieving the credential based on the one or more addresses from the blockchain. The process may be randomized to improve security, and the policy by which factors are requested can be defined by the systems administrators.

Another example embodiment may include an apparatus including a processor configured to perform one or more of store a public key and one or more corresponding addresses associated with a user profile in a blockchain, create a credential for the user profile based on the public key, forward the credential to the one or more addresses, a receiver configured to receive a request for access to a site from a user device associated with the user profile, and the processor is further configured to retrieve the credential based on the one or more addresses from the blockchain.

Yet another example embodiment may include a non-transitory computer readable storage medium configured to store instructions that when executed cause a processor to perform one or more of storing a public key and a corresponding address associated with a user profile in a blockchain, creating a set of credentials for the user profile based on the public keys, forwarding the credentials to the one or more addresses, receiving a request for access to a site from a user device associated with the user profile, and retrieving the credential based on the one or more addresses from the blockchain. The process may be randomized to improve security, and the policy by which factors are requested can be defined by the systems administrators.

DETAILED DESCRIPTION

Figure 1A:
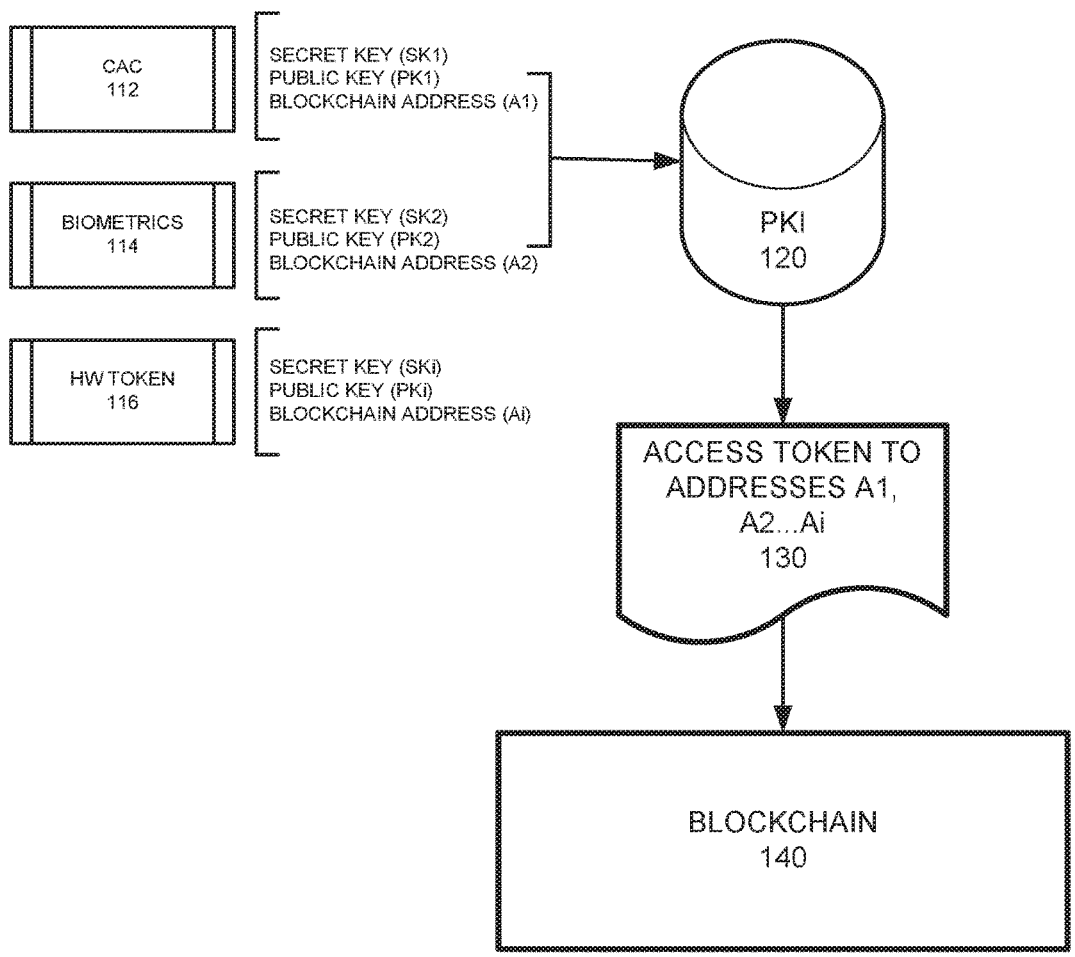
FIG. 1A illustrates a key generation procedure which utilizes a blockchain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to the management of authorization access and in another embodiment relates to managing access to data by authorized parties based on a decentralized multi-factor authentication process including software and hardware token verification for a blockchain authentication performed via hard/soft token verification.

Example embodiments provide using a blockchain to support decentralized multi-factor authentication to validate passwords, support CAC systems, hardware tokens, and/or usage of biometrics via the issuance of soft tokens. Using blockchain technology to provide multi-factor authentication provides support for a validation protocol, which permits a decentralized verification authority. This approach supports high-availability, high fault tolerance, high-redundancy, etc., so the infrastructure can withstand cyber-attacks.

The issuance of software tokens provides a way to prove ownership of private information via blockchain technology. This approach permits verification tokens to be issued across different organizations/blockchains and supports tactical cloud access control deployments that will operate in a decentralized configuration. Other features include blockchain address and key derivation from passwords, EPIDs, hardware token codes, biometrics, and/or other types of authentication, via proof-of-ownership of private data via public keys in a blockchain.

According to example embodiments, software token verification is used in combination with hardware tokens using blockchain as a distribution infrastructure. The approach permits issuance of token/access controls via a blockchain, while permitting the authentication of users across different organizations without the need to access the back-end DoD PKI (e.g., private PKI systems). This is performed by extending the basic logic in a CAC card to provide a blockchain address/public key that is then pushed to the blockchain, which is used to verify the user of the card, as well as validate a signature. Similarly, each user will have a dedicated set of addresses where software tokens that are generated at the same rate as their hardware tokens are generated. The software tokens are sent to the address to prove ownership of the token. Each token is in the form of an access control rule needed by services to authenticate the user. By validating hardware token codes using the data in the blockchain, there is no need for a centralized backend server to manage the authentication process. The validation offered by the blockchain approach provides support for validation of biometrics information without a central authority, validation of CAC cards without a central authority, verification of hardware tokens, and/or issuance of private network access control lists (ACLs) in a public network. One approach is the use of any random 'N' number of authentication factors out of 'M' total authentication factors. For example, consider a system, where authentication factors include password, PIN, picture password, fingerprint, and CAC, which is a total of 5 factors in this example. This configuration would enable the registration of all 5 factors by registering the public keys associated with the factors with the blockchain verification service. Upon the need to authenticate a user, the authentication service will challenge users by requiring answers to n-of-m authentication factors (n-factors). For instance, given the 5 factors above, the system will require 3-of-5 factors to authenticate. This permits users to add/remove authentication factors on demand, in case a factor is lost or compromised.

FIG. 1A illustrates a key generation procedure which utilizes a blockchain according to example embodiments. Referring to FIG. 1A, the configuration 100 includes more than one option for authentication, including CAC 112, biometrics 114 and/or a hardware (HW) token 116. The key generation may be from any of those sources. A key may include a secret key, SK1, a public key PK1 and a blockchain address A1, where the information is stored. In this n-factor authentication scheme 100, a public/private key pair is generated (SK, PK) for each of the private data items which are used. For instance, the EPID, a hardware token code, or some bioinformation data may be part of the encryption process. According to one example, any combination of 'n' operations may be used. For instance, in order to enable a multi-factor authentication provider, a password would need to be owned and used as a 'seed' to generate a public/private key pair. Next, the public key would be published and used to authenticate. Also, a blockchain address would be derived from the public key, which would permit anyone to send an ACL/software token, which may be used to register their device, via the established addresses, with a centralized authority (e.g., a corporate PKI 120), which will then generate an ACL or an access token and send it to a particular address 130 in the blockchain 140. Access controls could be static, or dynamic, enforced through the use of smart contracts/chaincode. For instance, instead of an ACL, a smart contract hash would be sent along with the necessary parameters needed to execute the smart contract in the blockchain fabric.

Figure 1B:
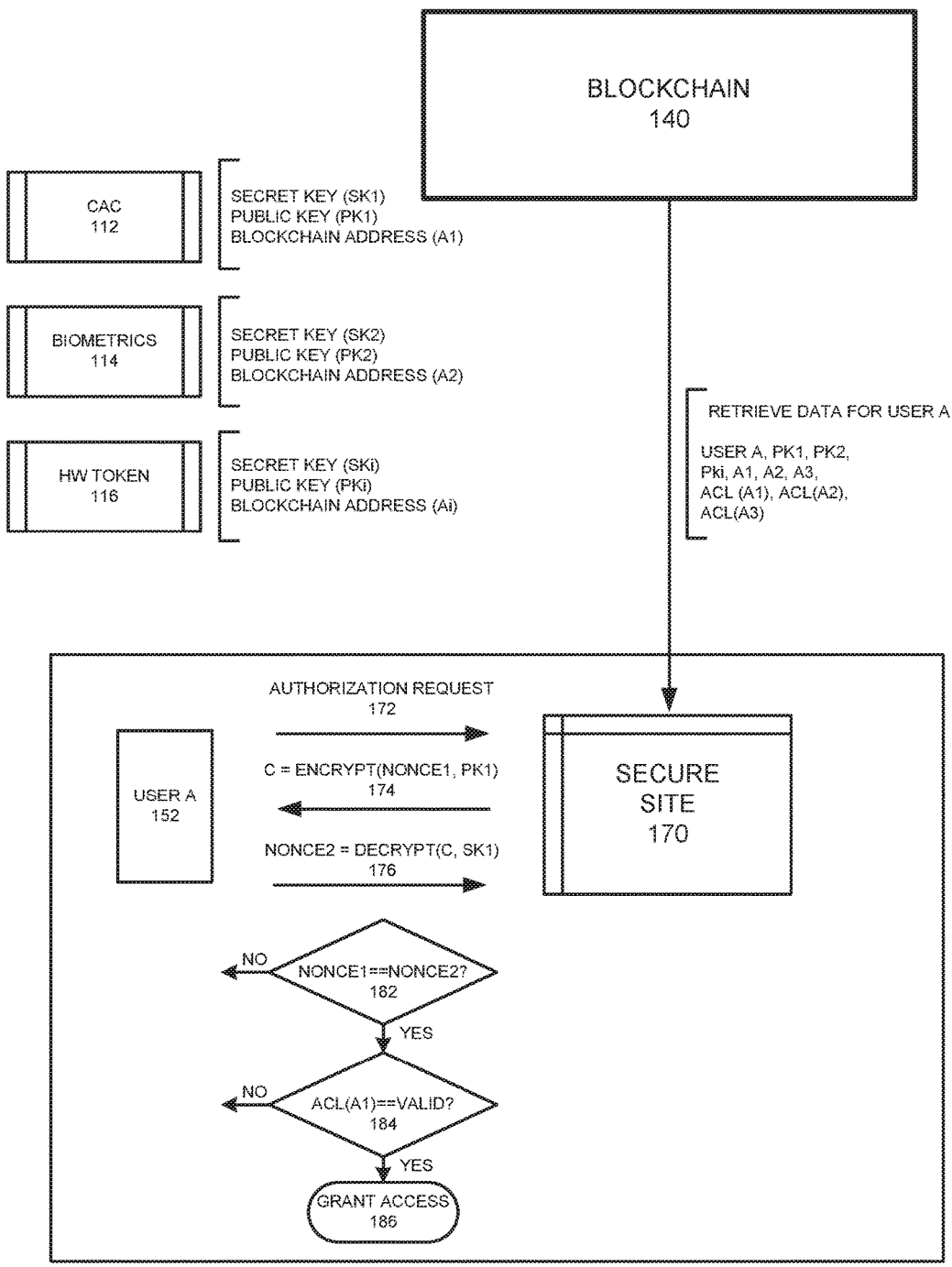
FIG. 1B illustrates a public address authentication scheme which utilizes a blockchain system configuration according to example embodiments.

FIG. 1B illustrates a public address authentication scheme which utilizes a blockchain system configuration according to example embodiments. Referring to FIG. 1B, the configuration 150 provides for using a public address in the blockchain to authenticate a user device. At any given time, if user 'A' 152 wants to authenticate and access a network system, once the user has registered his/her public keys/addresses and they have been published in the blockchain 140, the ACLs are also generated and sent to user A's addresses in the blockchain. In the case of the hardware token, these ACLs will be issued according to a required time window, and since the token code is used to derive user A's next address, there is no need to register it with the system, as traditional infrastructures permit for hardware tokens to stay in synchronization with their home servers.

The authentication operations may provide user A 152 submitting a request 172 from a mobile device or other computing device in an attempt to access a site 170. The request may include various addresses associated with the device, such as A1, A2, and Ai, where 'i' is the current iteration of the hardware token. The website 170 will then request this data from the blockchain 140. The website will send a challenge to the user device with a nonce 174 and will select one of n random means of authentication. For instance, if PK1 is selected, which belongs to the CAC card of the user device, the device will receive the cyphertext and decrypt it with a private key (SK1). The process requires that the user A 150 enter a PIN or other secret word or phrase and then the SK is derived from that EPID, or it is already stored within the CAC card of the user device 150. The card then uses the SK to decrypt 176 the cyphertext and receive back a nonce2. The site 170 will verify that nonce1==nonce2 182. Next, if the above check passed, the next operation is to verify the ACL owned by user A. If the ACL is valid 184 (e.g., user A has the right privileges), then access is granted 186, otherwise, the user A authorization is rejected. A similar approach is used for biometric data and the hardware token. One difference is that the biometric data will require user A to provide biometrics, from which a keypair is generated on the fly. The biometrics logic will then use this to sign/encrypt/decrypt data. In the case of biometrics, we can have two embodiments. One is the use of a random public/private key pair, which is unlocked by using biometrics to authenticate with a trusted device (e.g., enrollment/authentication within a mobile device). A second embodiment would be the use of biometric signal extraction (e.g., template extraction) as well as quantization in order to generate a seed, which, when combined with a random salt, can then be used to derive a public/private key pair. The scheme could go beyond authentication as messages could be signed and provide non-repudiation.

Figure 2:
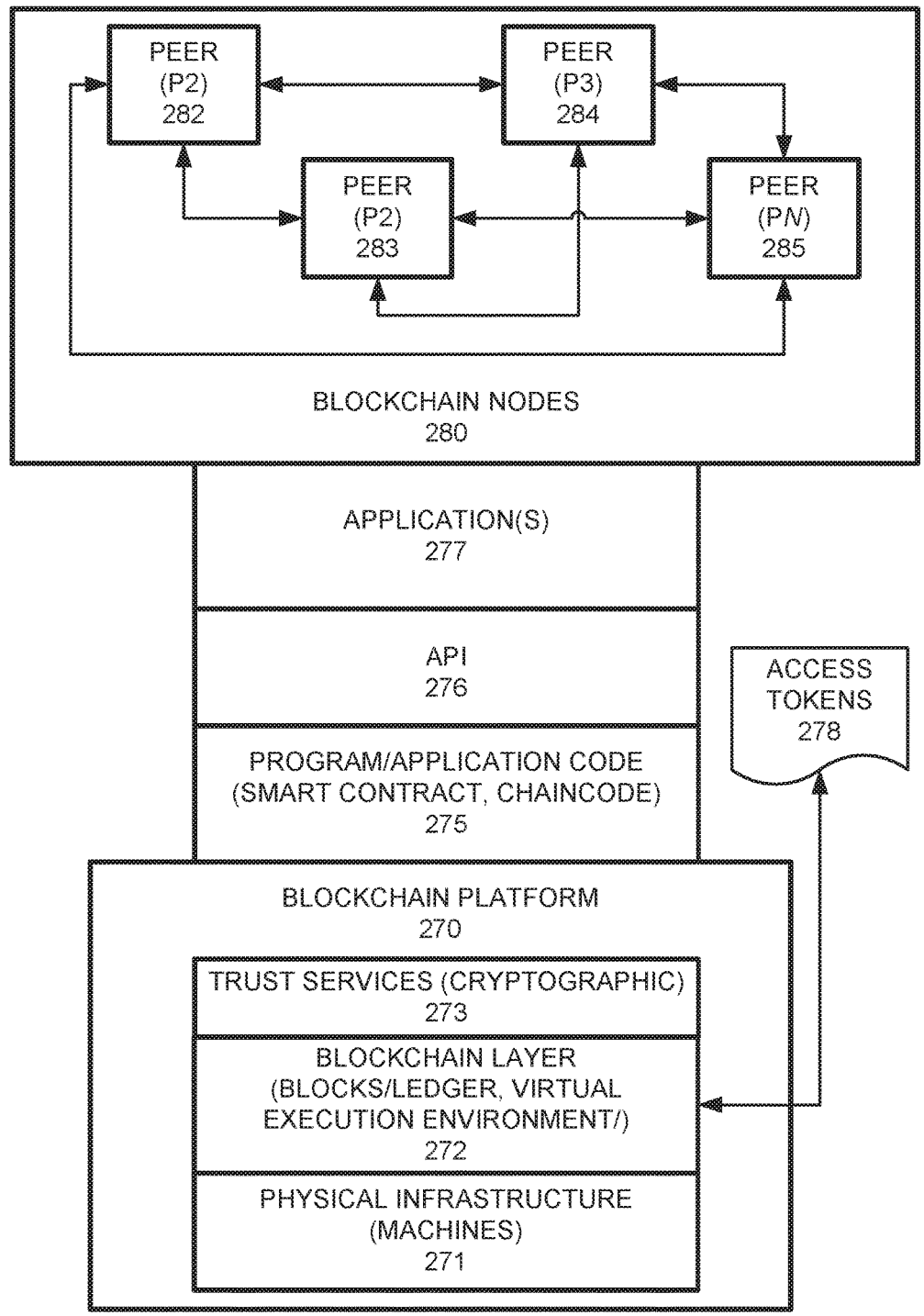
FIG. 2 illustrates a blockchain architecture configuration according to example embodiments.

FIG. 2 illustrates a blockchain system configuration according to example embodiments. The blockchain system 200 may include certain common blockchain elements, such as a group 280 of assigned blockchain peer nodes 282-285 which participate in the blockchain transaction addition and validation process (consensus) and/or may have access to the blockchain. Any of the blockchain peer nodes 280 may initiate new transactions and seek to write to the blockchain immutable ledger 272, a copy of which is stored on the underpinning physical infrastructure 271. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control owned assets, and receive external information. This code can be deployed as a transaction and installed, via appending to the distributed ledger, on all blockchain peer nodes.

The blockchain base 270 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 272 exposes an interface that provides access to the virtual execution environment necessary to process the program code and engage the physical platform 271. Cryptographic trust services 273 are used to verify transactions and keep information private. According to example embodiments, the blockchain ledger may store address information and other data, such as tokens 278 for various user devices. Those tokens and other authentication data may be used to authenticate those devices when they seek to access a third party secure site. The blockchain configuration of FIG. 2 may process and execute program/application code 175 by the interfaces exposed, and the services provided, by blockchain platform 270. The code may control blockchain assets, for example, it can store and transfer data, and may be executed by the blockchain in the form of a smart contract, which includes chain code with conditions or other code elements subject to its execution.

Figure 3:
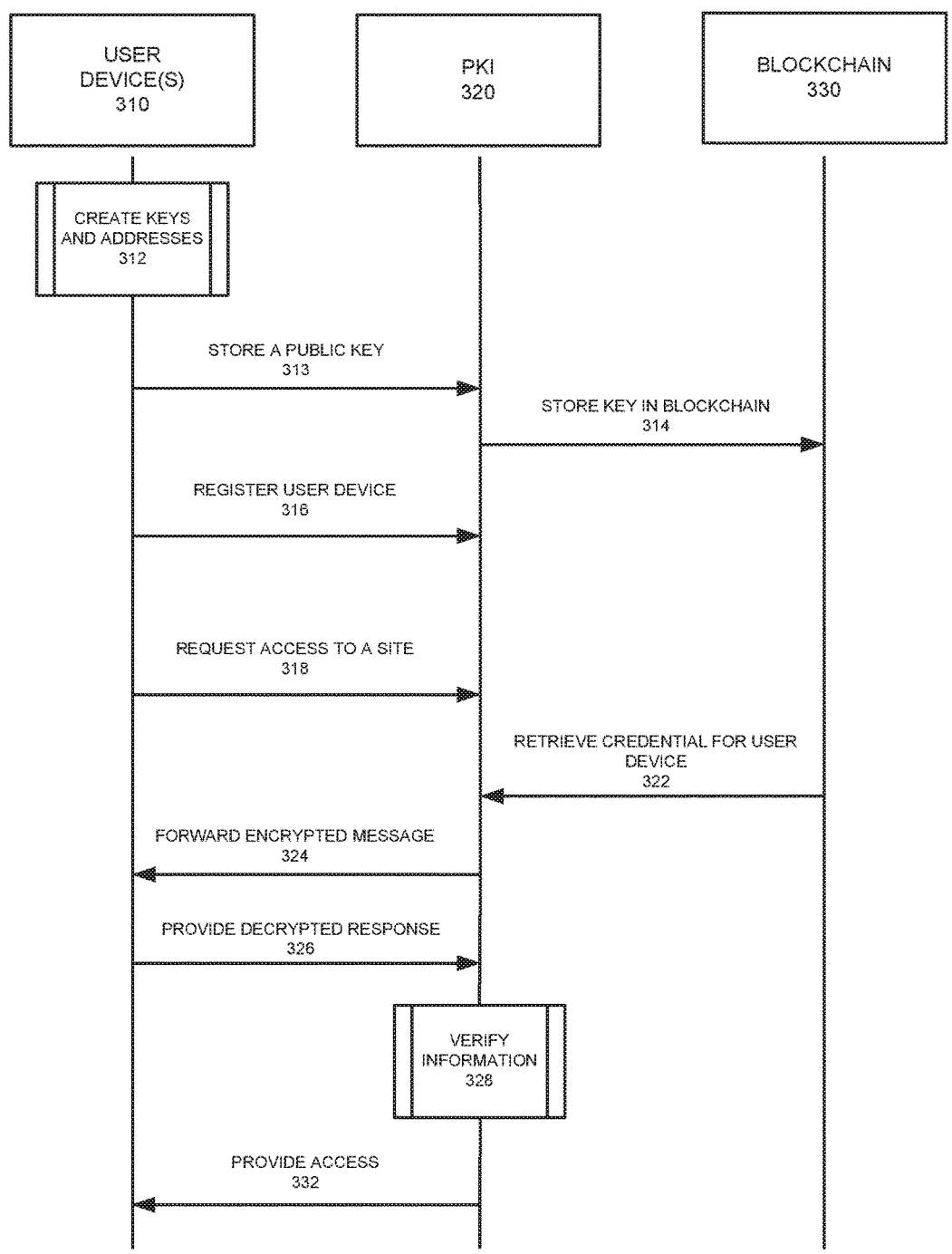
FIG. 3 illustrates a system messaging diagram of the interactions between user devices, security entities and the blockchain according to example embodiments.

FIG. 3 illustrates a system messaging diagram 300 of the interactions between a number of components or modules which may include software, hardware or a combination of both. The components may include a first component, such as user devices, a second component, such as PKI and a third component, such as a blockchain, according to example embodiments. Referring to FIG. 3, a user device 310 may be seeking access to various user profile information stored in the blockchain 330. In order to receive access, a process may include creating keys and unique addresses to store the keys 312. The public key 313 may be stored based on a key made via the PKI 320 and stored 314 in a blockchain 330. The user device may be registered 316 and as subsequent access attempts are made 318, the stored credential may be retrieved from the blockchain 322 and forwarded as an encrypted message 324. A decrypted message response 326 may indicate the proper credentials which can be verified 328 so access can be provided 332.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 310, 320 and 330 may be directly connected or communicably coupled to one another, in a wired or wireless manner, and may reside locally and/or remotely.

Figure 4A:
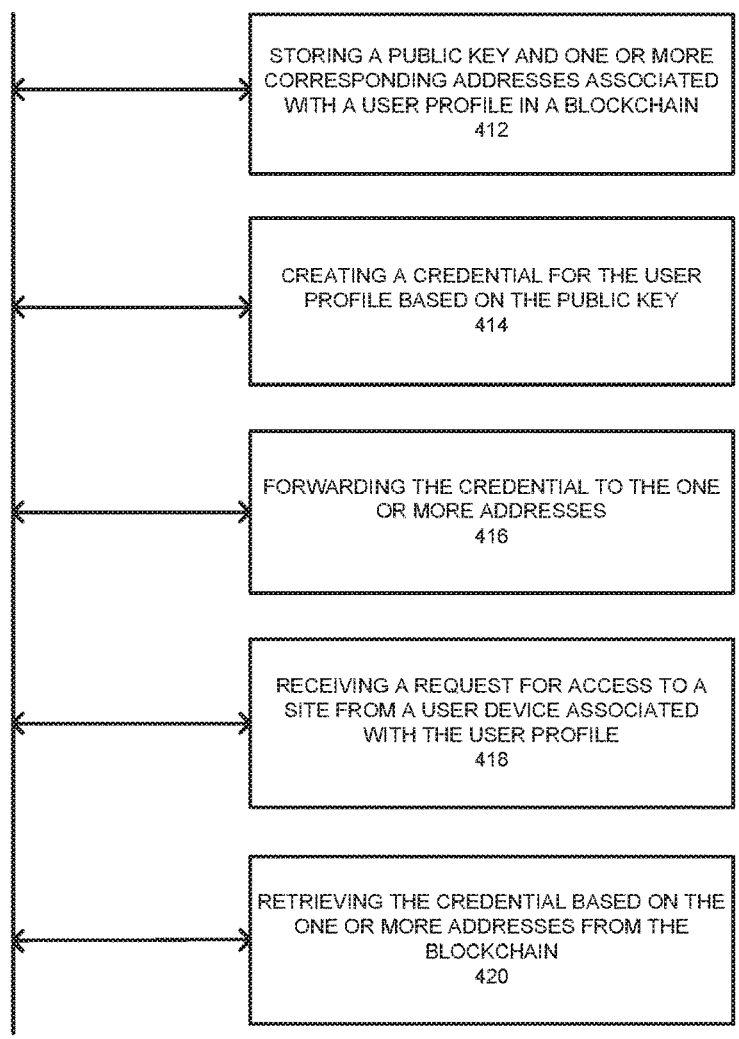
FIG. 4A illustrates a flow diagram of an example method of managing authentication in the blockchain, according to example embodiments.

FIG. 4A illustrates a flow diagram 400 of an example method of managing authentication in the blockchain, according to example embodiments. Referring to FIG. 4A, the method may include storing a public key and one or corresponding addresses associated with a user profile in a blockchain 412, creating a credential for the user profile based on the public key 414, forwarding the credential to the one or more addresses 416, receiving a request for access to a site from a user device associated with the user profile 418, and retrieving the credential based on the one or more addresses from the blockchain 420.

The credential is an access control list (ACL). The credential is created within a limited time window. The one or more addresses include a plurality of address locations corresponding to a plurality of credentials over a plurality of access attempt iterations. The request includes the plurality of addresses locations. Also, the method may also include responsive to receiving the request, transmitting an encrypted message to the user device, and receiving a decrypted message based on the encrypted message. The method may also include comparing decrypted message content of the decrypted message to encrypted message content of the encrypted, and when the decrypted message content matches the encrypted message content, then verifying the credential is valid, and if so, granting access to the user device.

Figure 4B:
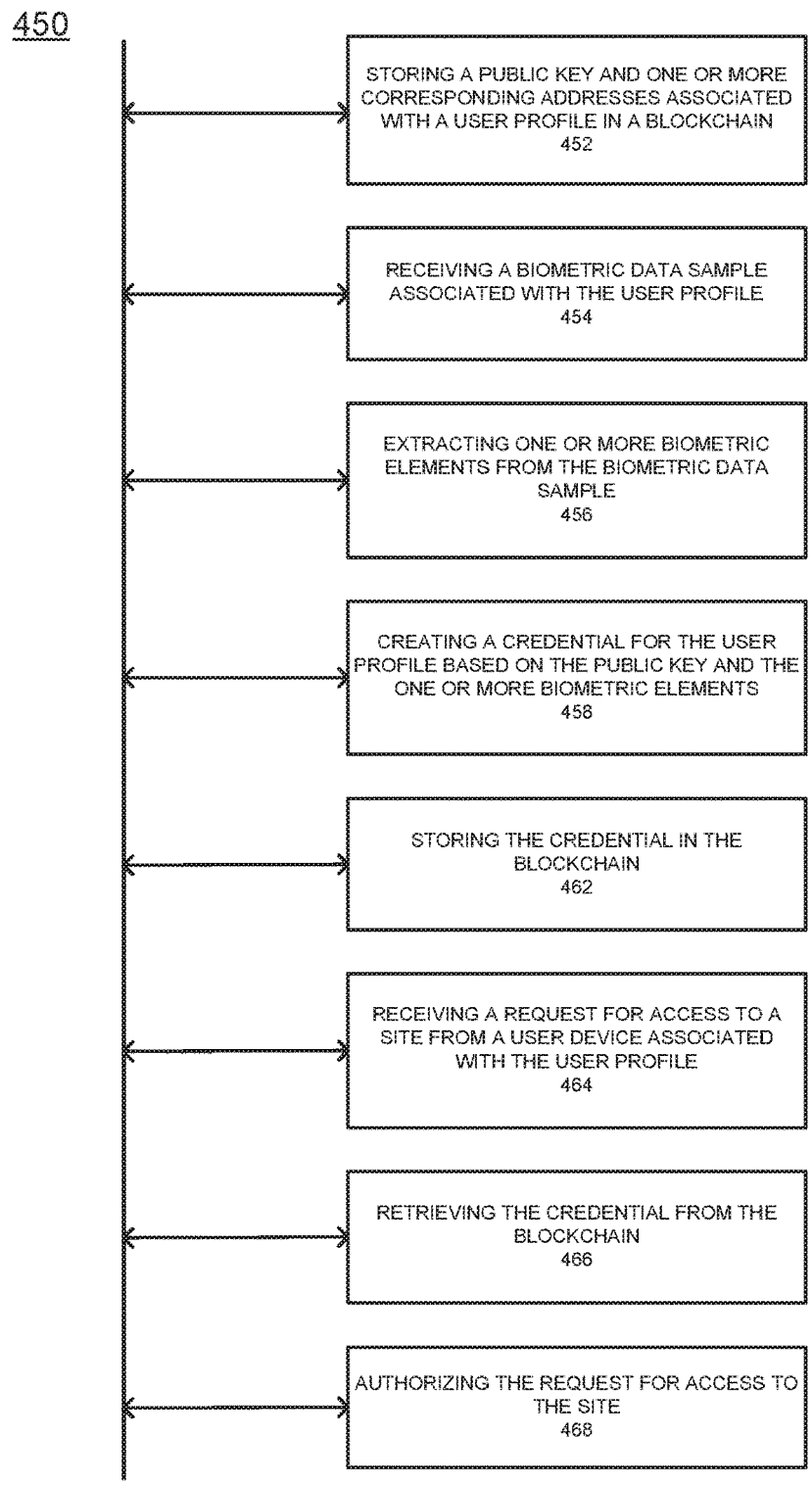
FIG. 4B illustrates another flow diagram of an example method of managing authentication in the blockchain, according to example embodiments.

FIG. 4B illustrates another flow diagram 450 of an example method of managing authentication in the blockchain, according to example embodiments. Referring to FIG. 4B, the method may include storing a public key and one or corresponding addresses associated with a user profile in a blockchain 452, receiving a biometric data sample associated with the user profile 454, extracting one or more biometric elements from the biometric data sample 456, creating a credential for the user profile based on the public key and the one or more biometric elements 458, storing the credential in the blockchain 462, receiving a request for access to a site from a user device associated with the user profile 464, retrieving the credential from the blockchain 466, and authorizing the request for access to the site 468.

The enrollment process begins with the generation of a public/private key pair, comprising a public key and a private key. In effect, an asymmetrical encryption system is created, wherein the public key is intended to be generally known and or available to persons other than the contributor, while the private key is intended to be kept private and known only to the contributor. The private key, after being used in the enrollment process to create an identifier should be either stored in a secure storage device, destroyed, or otherwise kept secret. The public/private key pair is used to amend and encrypt a transaction request. The transaction request may be a transaction message or other encrypted entry in a transaction ledger. Next, a biometric sample is received and along with a PIN or password or some other type of securing data. A biometric extraction may be used to derive biometric features from the biometric sample. The biometric elements, the private key and optionally other data is used to combine the inputs and output an embed function which is then transformed through a cryptographic one-way function which outputs a combined identifier which cannot be readily recreated by outside parties.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
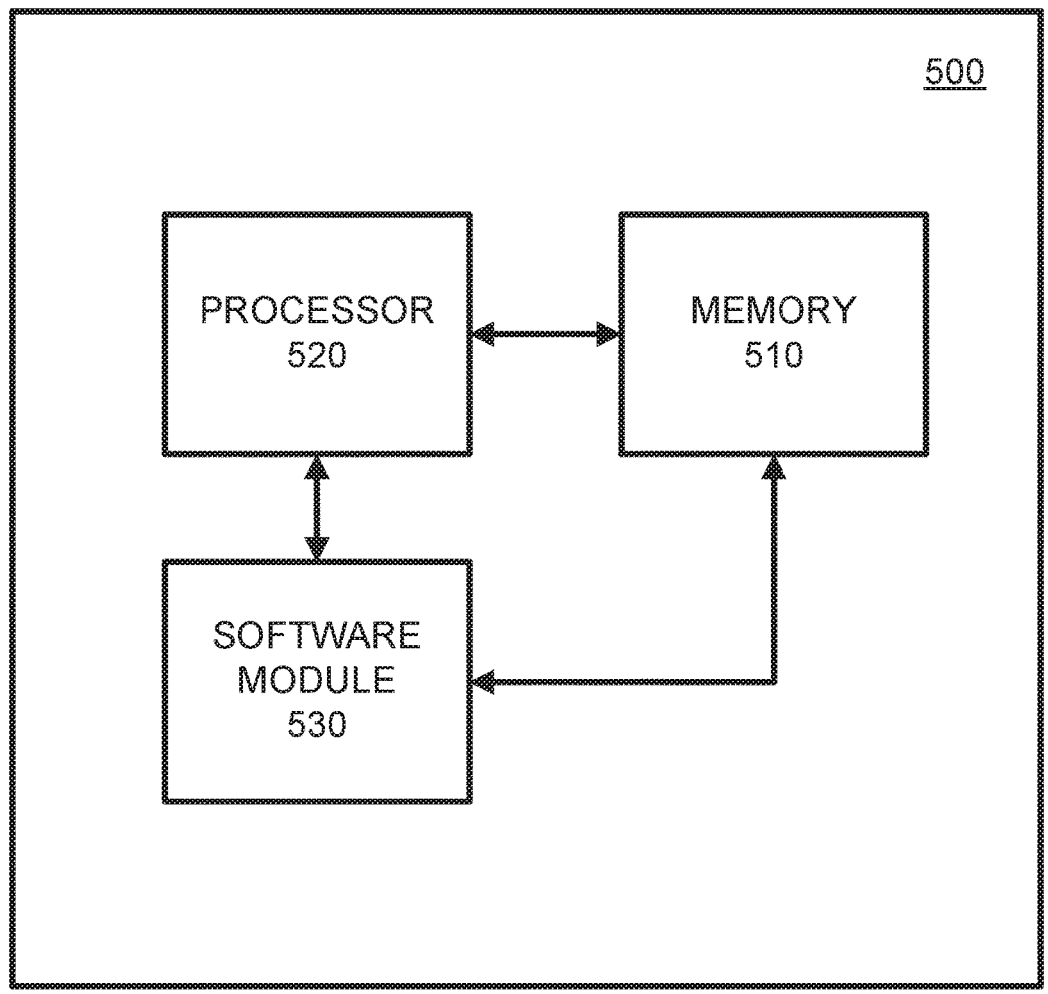
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   storing a public key and one or more corresponding addresses associated with a user authentication factor in a blockchain;
   creating a smart contract based credential for the user authentication factor associated with the public key;
   receiving a request for access to a site from a user device associated with the user authentication factor; and
   executing the smart contract corresponding with the smart contract based credential to determine a type of access credential required for access to the site based on the address being used on the blockchain.

2. The method of claim 1, wherein the executing the smart contract includes determining a subset of authentication factors.

3. The method of claim 1, wherein the smart contract based credential is created within a limited time window.

4. The method of claim 3, wherein the one or more addresses comprise a plurality of address locations corresponding to a plurality of smart contract based credentials over a plurality of access attempt iterations.

5. The method of claim 4, wherein the request comprises the plurality of addresses locations.

6. The method of claim 1, further comprising:
   responsive to receiving the request, transmitting an encrypted message to the user device; and
   receiving a decrypted message based on the encrypted message.

7. The method of claim 6, further comprising:
   comparing decrypted message content of the decrypted message to encrypted message content of the encrypted; and
   when the decrypted message content matches the encrypted message content, then verifying the smart contract based credential is valid, and if so, granting access to the user device.

8. An apparatus, comprising: a hardware processor configured to: store a public key and one or more corresponding addresses associated with a user authentication factor in a blockchain; create a smart contract based credential for the user authentication factor associated with the public key; a receiver configured to receive a request for access to a site from a user device associated with the user authentication factor; and wherein the processor is further configured to execute the smart contract corresponding with the smart contract based credential to determine a type of access credential required for access to the site based on the address being used on the blockchain.

9. The apparatus of claim 8, wherein the processor configured to execute the smart contract includes the processor being configured to determine a subset of authentication factors.

10. The apparatus of claim 8, wherein the smart contract based credential is created within a limited time window.

11. The apparatus of claim 10, wherein the one or more addresses comprise a plurality of address locations corresponding to a plurality of smart contract based credentials over a plurality of access attempt iterations.

12. The apparatus of claim 11, wherein the request comprises the plurality of addresses locations.

13. The apparatus of claim 8, wherein the processor is further configured to:
    responsive to the request being received, forward an encrypted message to the user device, and wherein the receiver is further configured to receive a decrypted message based on the encrypted message.

14. The apparatus of claim 13, wherein the processor is further configured to:
    compare decrypted message content of the decrypted message to encrypted message content of the encrypted; and
    when the decrypted message content matches the encrypted message content, then verify the smart contract based credential is valid, and if so, granting access to the user device.

15. A non-transitory computer readable storage medium configured to store instructions that when executed cause a processor to perform:
    storing a public key and one or more corresponding addresses associated with a user authentication factor in a blockchain;
    creating a smart contract based credential for the user authentication factor associated with the public key;
    receiving a request for access to a site from a user device associated with the user authentication factor; and
    executing the smart contract corresponding with the smart contract based credential to determine a type of access credential required for access to the site based on the address being used on the blockchain.

16. The non-transitory computer readable storage medium of claim 15, wherein the executing the smart contract includes determining a subset of authentication factors.

17. The non-transitory computer readable storage medium of claim 15, wherein the smart contract based credential is created within a limited time window.

18. The non-transitory computer readable storage medium of claim 17, wherein the one or more addresses comprise a plurality of address locations corresponding to a plurality of smart contract based credentials over a plurality of access attempt iterations.

19. The non-transitory computer readable storage medium of claim 18, wherein the request comprises the plurality of addresses locations.

20. The non-transitory computer readable storage medium of claim 15, wherein the processor is further configured to perform:
- responsive to receiving the request, transmitting an encrypted message to the user device;
- receiving a decrypted message based on the encrypted message;
- comparing decrypted message content of the decrypted message to encrypted message content of the encrypted; and
- when the decrypted message content matches the encrypted message content, then verifying the smart contract based credential is valid, and if so, granting access to the user device.

* * * * *